United States Patent
Degani et al.

(10) Patent No.: US 11,041,947 B2
(45) Date of Patent: Jun. 22, 2021

(54) RADAR DETECTION METHODS AND SYSTEMS FOR IDENTIFYING MOVING OBJECTS

(71) Applicant: Inxpect S.p.A., Brescia (IT)

(72) Inventors: Alessio Degani, Brescia (IT); Andrea Tartaro, Brescia (IT)

(73) Assignee: INXPECT S.P.A., Brescia (IT)

(*) Notice: Subject to any disclaimer, the term of this patent is extended or adjusted under 35 U.S.C. 154(b) by 323 days.

(21) Appl. No.: 16/152,837

(22) Filed: Oct. 5, 2018

(65) Prior Publication Data
US 2019/0107613 A1    Apr. 11, 2019

(30) Foreign Application Priority Data
Oct. 6, 2017  (IT) .................. 102017000112400

(51) Int. Cl.
*G01S 13/538* (2006.01)
*G01S 13/536* (2006.01)
*G01S 13/72* (2006.01)

(52) U.S. Cl.
CPC .......... *G01S 13/538* (2013.01); *G01S 13/536* (2013.01); *G01S 13/723* (2013.01); *G01S 13/726* (2013.01)

(58) Field of Classification Search
CPC ....... G01S 13/538; G01S 13/536; G01S 13/72
See application file for complete search history.

(56) References Cited

U.S. PATENT DOCUMENTS

| 5,302,956 A | 4/1994 | Asbury et al. |
| 6,535,159 B1 * | 3/2003 | Nishiguchi .......... G01S 5/0284 340/552 |
| 2002/0109624 A1 | 8/2002 | Schutz et al. |
| 2012/0276849 A1 | 11/2012 | Hyde et al. |
| 2013/0335261 A1 * | 12/2013 | Kajiki ..................... G01S 13/56 342/107 |

(Continued)

FOREIGN PATENT DOCUMENTS

| EP | 0 188 757 A1 | 7/1986 |
| EP | 0 766 100 B1 | 3/2001 |

OTHER PUBLICATIONS

Italian Search Report and Written Opinion dated Jun. 20, 2018, in IT Application No. 102017000112400, 9 pages.

*Primary Examiner* — Erin F Heard
*Assistant Examiner* — Donald HB Braswell
(74) *Attorney, Agent, or Firm* — MH2 Technology Law Group, LLP

(57) ABSTRACT

A method and system for identifying an object in one space monitored by at least one radar transceiver. The method comprises storing intervals of critical distance values (10) associated with the position of a fixed object upon which a time-varying radio signal shadow may be generated, which may be confused with a moving object. Through successive radar detections, the signals are processed and generate a measurement range profile (40), from which a background range profile (41) is extracted to obtain an object range profile (50). The distance of a possible detected object (60) is determined from the analysis of the object range profile. If the distance of the object (4) is external to the critical intervals (51), the object is classified as valid (55). If the distance is internal to the intervals, the detected object may be a shadow and unless further checks are performed, its presence is not indicated.

10 Claims, 8 Drawing Sheets

(56) References Cited

U.S. PATENT DOCUMENTS

2015/0331086 A1    11/2015  Hassen
2016/0214534 A1*   7/2016   Richards .............. H04N 13/204
2018/0003816 A1*   1/2018   Olson ................ H04B 7/18506
2019/0094350 A1*   3/2019   Baheti .................... A61B 5/024

* cited by examiner

RADAR DETECTION METHODS AND SYSTEMS FOR IDENTIFYING MOVING OBJECTS

CROSS-REFERENCE TO RELATED APPLICATION(S)

This application claims priority under 35 U.S.C. § 119 from Italian Patent Application No. 102017000112400, filed on Oct. 6, 2017, in the Italian Patent and Trademark Office ("IPTO"), the entire contents of which are incorporated herein by reference.

FIELD OF THE INVENTION

The invention relates to a method and a system for discriminating a moving object from the shadow cast by a moving object on a fixed object that is permanently present in a space monitored by one or more radar transceivers. The present invention particularly finds application in the field of intrusion prevention monitoring.

DESCRIPTION OF THE PRIOR ART

Radar systems can locate an object within a monitored space. Particularly, a radar transceiver sends a radio signal that covers a space, referred to hereinafter as a monitored space or visual field, and receives the signal reflected from the object. Then, the transceiver determines the distance of the target by processing the transmitted signal and the reflected signal.

Various techniques are known for determining the position of the target by transmitting an electromagnetic signal with a specific waveform and later processing the detected reflected signal in combination with the transmitted signal. For example, Frequency-Modulated Continuous Wave (FMCW) or Stepped-Frequency Continuous Wave (SFCW) techniques can generate a range profile as signal amplitude profile according to a distance from the transceiver. The range profile includes amplitude peaks indicative of the presence of targets at respective distances.

By analyzing the signals picked up by multiple antennas a direction of the detected object may be also determined. EP 0766100 discloses a radar system that comprises transmitting means, receiving means comprising at least two antennas and processing means for determining the azimuth of an object based on the analysis of frequency spectra obtained from respective beat signals.

US 2015/0331086 concerns a radar system which compares a composite signal deriving from a combination of signals from a plurality of receiving antennas with the individual signals from each receiving antenna to detect multiple objects or targets.

U.S. Pat. No. 5,302,956 relates to a radar system for avoiding vehicle collisions using digital signal processing techniques. The system includes a microwave transceiver section, a digital electronics section, a display and a sensor section. The digital electronics section can identify and track a plurality of targets. The targets are distinguished by frequency (i.e. Doppler shift amount).

In intrusion prevention monitoring, radar systems are often used to monitor a residential or work environment. As a result, the signal transmitted from a transceiver is reflected both from fixed objects that are permanently present in the environment such as furniture or walls, and from any foreign bodies, generally moving, which enter the monitored space.

Known background removal techniques allow the radar system to distinguish the signal reflected from a moving object in the monitored space from the signal reflected from fixed objects that are still present in it. Therefore, the radar may decide whether to trigger an alarm based on the signal reflected only from actually intruding objects. Background removal techniques, for instance in FMCW or SMCW systems, are based on the assumption that fixed objects are in fact stationary relative to the signal receiving antenna/s, and that the signal reflected therefrom signal is constant with time.

For example, a first technique of these removal techniques includes storing a background range profile obtained during radar detection, in which no foreign objects are present in the monitored space. During each subsequent detection, the transceiver generates a measurement range profile obtained by processing the transmitted signal and the overall reflected signal. Then, the background range profile is removed from the measurement range profile to obtain a range profile that only has the signal peaks associated with moving objects external to the original environment, if the background signal is constant with time.

A second background removal technique includes performing a new estimate of the background range profile at each radar detection. Here, the estimate is given by the average of the range measurement profiles corresponding to a respective plurality of previous measurements, for example by calculating an average of recent time-sorted detections. In this case the estimated background range profile is also influenced by the presence of intruding objects. Nevertheless, if the intruding objects remain for a relatively short time in the same position during their motion, the estimate of the background range profile obtained by recalculating a new average range profile at each detection temporally converges to a range profile that only represents the contribution of the fixed-object related signal.

A third background removal includes processing the reflected signal to check, for each position, whether the frequency of the reflected signal has changed due to the Doppler effect. The background range profile is estimated considering only the reflected signal without Doppler effect.

Document U.S. Pat. No. 6,535,159 describes a radar system using two different technics for detecting the distance of close and far objects. In detail, for close objects standard methods are used, while for far objects it was found that the signal reflected by the target to be detected is weak and may be confused with background noise. Therefore, in order to extend the radar field of view, highly reflective objects are arranged relatively far from the radar at various distances. Then, an object to be detected will cast shadows on the highly reflective objects further from the radar, and thus the radar can recognize its presence by the fact that signal peaks corresponding to some of the highly reflective objects are no more detected. Therefore, at least a rough estimate of the object position is obtained even at such distances, i.e. its presence in a space between two distinct highly reflective objects.

SUMMARY OF THE INVENTION

Background removal methods are generally effective if the signal reflected from the fixed objects is constant with time. The Applicant realized that this assumption does not apply always, especially when a "fixed" object in the environment reflects the electromagnetic waves transmitted from a transceiver and has a relatively large size.

If an intruding object enters the space monitored by a transceiver and passes between the latter and the reflecting fixed object, the intruding object acts as an obstacle for the radio signals transmitted by the transceiver and then casts a "shadow" on the fixed object, which receives a weaker radio signal. Therefore, the signal reflected from the fixed object is changed, generally due to a signal decrease during the passage of the moving when part of the fixed is shadowed, and to a subsequent signal increase after the passage of the moving object. The increase of the radio signal with respect to the previously acquired values may be interpreted by the transceiver as the presence of an additional moving object in the environment, sometimes even larger than the moving object that is actually present. The Applicant found that this problem may arise due to the use of different background removal techniques, for example in both cases of continuous background signal estimate and single initial background signal estimate.

Such misinterpretation may lead to the generation of false alarms by the radar system. For example, a system may be configured to only indicate the presence of moving objects in certain "forbidden" positions in its observation field, for instance at access points (e.g. doors, windows). A different scenario in which the radar may trigger a false alarm is, for example, when a small object, such as a bird, passes through the observation field of the system. The system, which is configured to only indicate objects larger than a certain threshold size, recognizes that the bird is a small object and as such does not require the generation of an alarm. Nevertheless, the bird may cast shadows of larger size, involving the risk that the radar will generate a useless alarm.

The Applicant found that, if the position of the radio signal-reflecting fixed objects in the environment is detected in the response of a transceiver, then one or more critical distance intervals may be defined in the visual field, in which the radar detection of a target may not represent a moving object in a background scenario, but an artifact caused by shadows cast by moving objects on the fixed objects.

Therefore, the present invention provides a method as defined in claim 1.

The present invention also relates to a radar system for detecting a moving object in a monitored space in which there is at least one radio signal-reflecting fixed object, the radar system comprising at least one transceiver configured to carry out the step of transmitting a continuous wave radio signal and receiving a return radio signal reflected from at least one object located inside the monitored space, and a control unit connected to the at least one transceiver and configured to carry out the steps of:
  storing one or more critical intervals of distance values relative to the receive antenna, the critical intervals being associated with the position of the at least one fixed object in the monitored space;
  receiving the transmitted signal and the return signal associated with a current radar detection at a current detection instant $t_k$;
  processing the transmitted signal and the return signal by producing a measurement range profile, wherein the range profile is an amplitude profile as a function of a distance from the at least one transceiver, and
  subtracting a background range profile from the measurement range profile, representative of the monitored space with no moving objects, so as to obtain an object range profile;
  analyzing the object range profile for the current radar detection by searching for amplitude peaks and respective associated distances, identifying an amplitude peak that represents a current object detected and selecting an object distance value $d_k$ corresponding to the identified amplitude peak;
  storing an object position $p_k$ which comprises the object distance value and the detection instant $t_k$;
  assessing the validity of the detected object, wherein assessing the validity comprises:
    determining whether the object distance value $d_k$ of the current object is internal or external to the one or more critical intervals of distance values;
    if said object distance value $d_k$ of the current object is external to the one or more critical intervals of distance values, classifying the current object as valid so as to identify the current object as a moving object in the monitored space; and
    if said object distance value $d_k$ of the current object is internal to the one or more critical intervals of distance values, classifying at least temporarily the current object as not valid so as to identify the current object as a fixed object in the monitored space.

In the preferred embodiments, the at least one radar transceiver comprises a transmitting antenna and a receiving antenna, the transmission of a continuous wave radio signal being carried out via the transmitting antenna and the reception of a return signal being carried out by the receiving antenna. The distance of an object from the transceiver is the distance relative the receiving antenna.

Preferably, the radar system comprises a plurality of transceivers configured to transmit and receive continuous wave radio signals, the radio signal of each transceiver covering a respective visual field, wherein the visual fields of adjacent transceivers of the plurality of transceivers are in a partially overlapped relationship and the joined fields of view form the monitored space of the radar system. Preferably, each transceiver transmits radio signals in a main transmission direction, wherein the main transmission directions lie in a detection plane, and the transceivers are arranged such that the main transmission directions of adjacent transceivers are distinct from one another.

The intervals of critical distance values represent the positions in the space monitored by the at least one transceiver where fixed objects upon which a shadow may be potentially cast are located. When an amplitude peak in the object range profile, caused by a change of the return signal, is external to an interval of critical distance values, the object associated with the peak is recognized as valid, i.e. as a real object. Conversely, if the amplitude peak is internal to a critical interval, the alleged object associated with the peak is assumed not to be necessarily a real object, but a shadow. In this case the object may not be reported by the radar system or may be reported only after further check.

In the preferred embodiments of the present invention, a method is provided that can also recognize as valid objects internal to the critical distance intervals, if one or more automatically checkable conditions are met. Preferably, if the result of the check on the position of the object relative to the critical distance intervals is that the object is internal to an interval of critical distance values, then the object is classified as an object "to be validated" and one or more automatic checks are performed.

It shall be noted that document U.S. Pat. No. 6,535,159 does not provide for collecting signal representative of an object, when it is in the far areas of the field of view in the spaces between couples of highly reflective fixed objects. Instead, the position of a moving object in said region is detected only indirectly ed imprecisely, since it is supposed not to generate a signal peak greater than background noise.

Therefore, the radar in such document has not resolving power enough to understand if a moving object is close to a fixed object, and then the problem of identifying a moving object when it is located at a distance from the radar corresponding also to a fixed object is not faced.

According to certain embodiments of the invention, a first check comprises determining the time of permanence of the detected object in an interval of critical distance values. If the time of permanence in the critical interval is greater than a predetermined threshold value, the detected object is validated. While the possibility exists that the radar system will generate false alarms for shadows cast for a long time on the same subject, if the real object that generates the shadow moves fast enough, the shadow will disappear or move from one object to another before the lapse of a time interval equal to the time threshold, which will significantly reduce the probability of generating false alarms.

A movable object moves in the monitored space along a trajectory that comprises at least one object position defined by the spatial position and an associated detection instant. In general, an object moves along a trajectory composed of a sequence of object positions detected at successive instants. A transceiver may detect a plurality of moving objects in the monitored space at a detection instant. In a preferred embodiment, the method and system include identifying and tracking each detected object in the object range profile.

In certain embodiments, the method comprises a second check to determine if the current object is an object that has been already validated in at least one radar detection preceding the current detection. If an object that falls within an interval of critical distance values at the current detection instant is nevertheless associated with a previously stored trajectory that has already been classified as valid, then the object is recognized as a real moving object.

Preferably, the radio-transmission signal of the at least one radar transceiver is a frequency-modulated continuous wave (FMCW) signal or a stepped-frequency continuous wave (SFCW) signal.

In one embodiment, the radar system employs radio waves having a frequency that ranges from 10 to 80 GHz, for example from 24.00 to 24.25 GHz, as required by the standard EN 300 440.

BRIEF DESCRIPTION OF THE DRAWINGS

The characteristics and advantages of the present invention will result from the following detailed description of a possible practical embodiment, illustrated as a non-limiting example in the set of drawings, in which.

DETAILED DESCRIPTION

Figure 1:
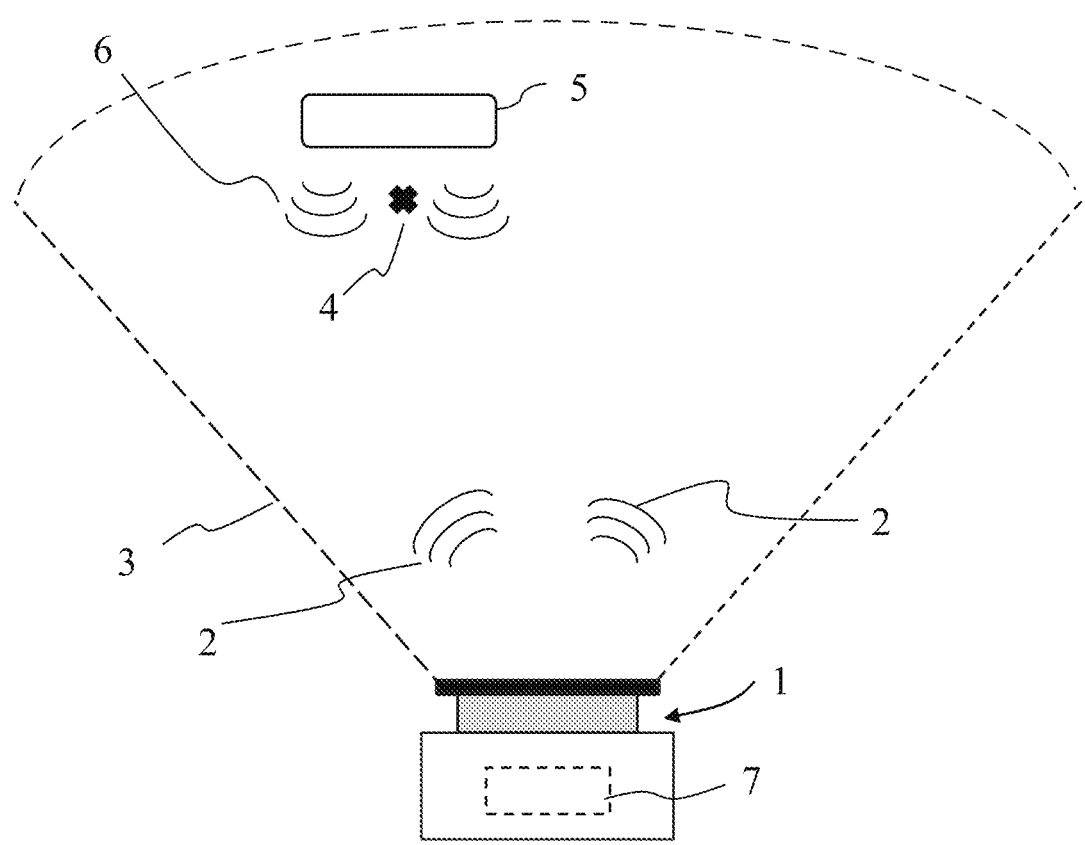
FIG. 1 schematically shows a radar system that can implement the method of the present invention.

The present invention may be implemented in a radar system that comprises at least one radar transceiver. Referring to FIG. 1, the radar system comprises a radar transceiver 1 configured to transmit and receive continuous wave radio signals 2 that cover a visual field 3, i.e. the monitored space, and to receive radio signals reflected 6 from one or more targets. The transceiver 1 comprises a transmitting antenna and a receiving antenna (not shown in FIG. 1). A control unit 7 is logically connected to the transceiver 1 for electronically controlling the transmission and reception of the signals and for electronically processing the transmit and receive radio-transmission and reception signals. The transceiver 1 is configured to transmit continuous wave radio signals via the transmitting antenna.

The method and the system particularly find application in intrusion prevention monitoring when at least one radio signal-reflecting fixed object 5 is present in the monitored space 3. It shall be understood that more than one fixed object may be present in the visual field. These fixed objects are permanently present in the monitored space, e.g. for an entire monitoring period consisting of a sequence of radar detections. The monitored space may be also delimited by one or more fixed objects, represented for example by walls, furniture or other fixtures.

The transceiver 1 transmits a radio signal 2 that is reflected by a moving object 4 in the field of view. The term moving object 4 is not necessarily intended to designate an object that moves at each instant, but also an object that remains temporarily still and changes position relative to the transceiver 1 between two successive detections separated by a time interval.

The fixed object 5 also reflects the radio signals transmitted by the transceiver, both in case of intrusion of moving objects, and when no foreign object is present. As is known per se, a transceiver that uses a SFDW or FMCW signal transmission technique distinguishes the signal that comes from the moving objects 4 from the signal reflected only by fixed objects 5, by measuring a return signal from the fixed objects only and processing the return signal to produce a background signal. As more clearly explained below, the method of the invention may use various prior art methods to distinguish the contribution originated from moving objects 4 in the received signal from the background contribution, i.e. to remove the background signal.

As schematically shown in FIG. 1, at a given instant or for a given time interval, the moving object 4 is placed between the transceiver and the fixed object 5 and creates an obstacle to the transmission of radio signals toward the stationary object, so that a portion of the fixed object 5 is shadowed due to the interposition of the moving object 4. The presence of temporary shadows causes a change in the signal reflected from the fixed object 5, which may be interpreted by the control unit 7, after background removal, as a moving object that is in the same position as the fixed object upon which the shadow is cast.

In the embodiment of FIG. 1, the method uses a single transceiver, preferably of monostatic type, i.e. with the transmitting antenna and the receiving antenna being the same antenna, or of pseudo-monostatic type, wherein the transmitting and receiving antennas are different antennas that are close to each other so that their positions may be deemed to be coincident if their distance is compared with the size of the monitored space. Therefore, for an object detected in the monitored space the distance from the receiving antenna and the distance from the transmitting antenna are substantially equal. In the following, the terms transmitting antenna and receiving antenna shall be understood to cover both cases.

Figure 8:
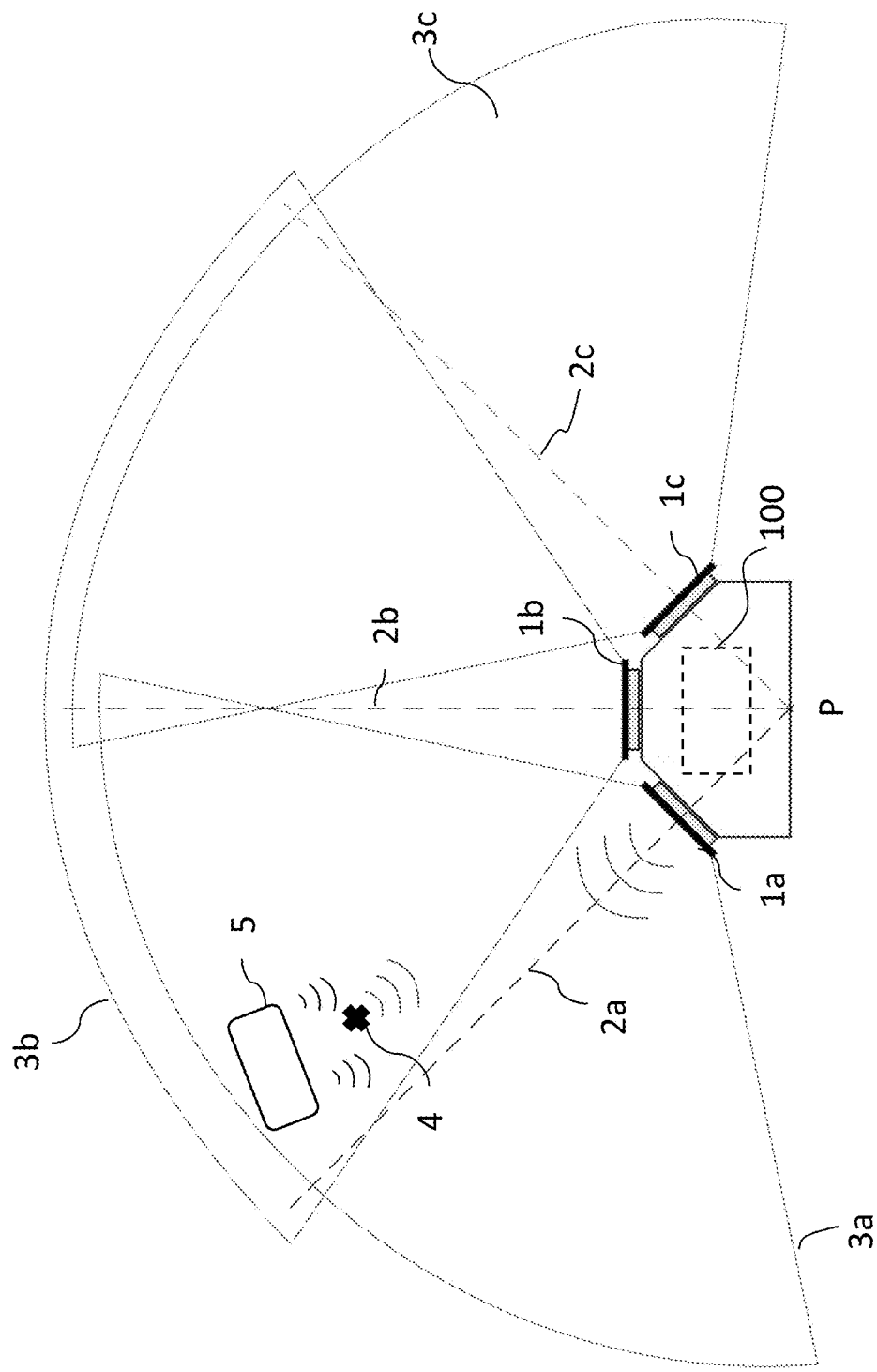
FIG. 8 shows a further radar system that can implement the method of the present invention.

In a different embodiment, the radar system comprises a plurality of transceivers, preferably of monostatic or pseudo-monostatic type. FIG. 8 schematically shows a preferred embodiment of a radar system comprising a plurality of transceivers, which will be described in greater detail below.

Preferably, the continuous wave radio signals transmitted by the radar are frequency-modulated continuous wave (FMCW) signals or stepped-frequency continuous wave (SFCW) signals.

In the present invention, the control unit 7 stores one or more intervals of critical distance values from the transceiver 1 in the monitored space (where the distance is from the receiving antenna of the transceiver), the one or more critical distance intervals being associated with the presence of at least one fixed object, whose extent in space is represented by a distributed amplitude above the threshold which generally spans a plurality of distance values in a range profile. Therefore, the position and extent of the fixed object are represented by an interval of critical distance values. Preferably, each interval of critical distance values comprises a continuous sequence of critical distance values.

Upon the passage of a moving object 4 that casts a shadow on a fixed object 5, the signal change associated with the shadow on the fixed object 5 will be detected by the radar at the fixed object 5, i.e. within an interval of critical distance values.

Figure 2:
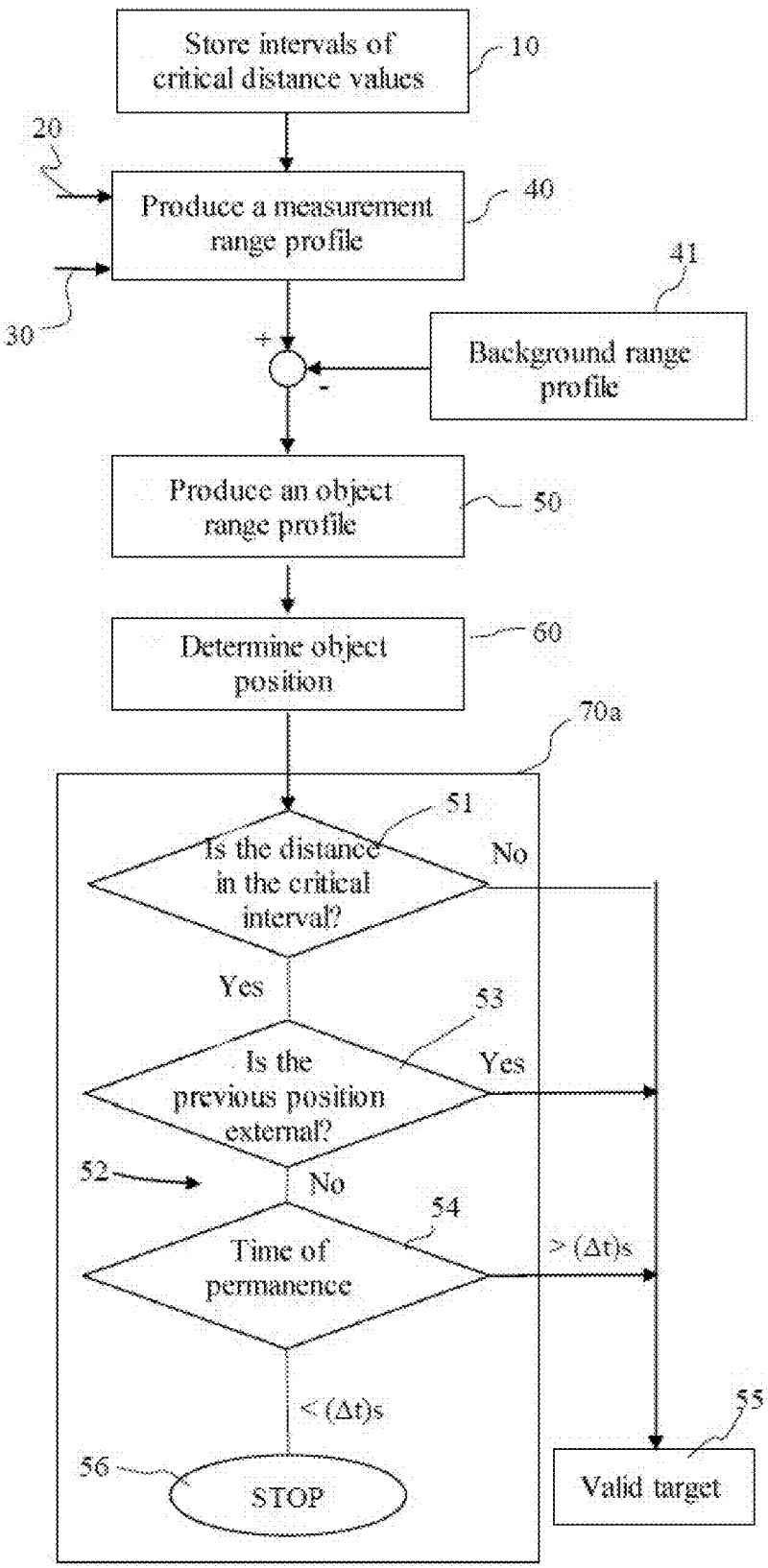
FIG. 2 is a flow chart representative of a method according to one embodiment of the invention.

FIG. 2 is a flow chart of a method for identifying a moving object 4 according to a first embodiment of the invention. The method, implemented by a computer program, comprises storing one or more intervals of critical distance values from the transceiver 1, i.e. relative to the receiving antenna, the critical distance intervals being associated with the distances of least one fixed object 5 in the monitored space 3 from the transceiver 1 (step 10).

The method comprises performing a plurality of radar signal detections, which are preferably repeated in a time sequence. The plurality of radar signal detections up to a given time instant, referred to herein as current detection instant, comprises a last detection, or current detection, and one or more detections preceding the current detection. After each radar detection, the control unit stores the data resulting from the processing of transmission and reception signals.

It shall be noted that the designation of a radar signal detection as "current" or "preceding" depends on the instant in which the plurality of radar detections is being considered. An object detected in the current detection will be designated as current object.

Still referring to FIG. 2, the method comprises, after the step 10, the step of performing a current radar detection at a current detection instant $t_k$ (k=1, 2, . . . ) which comprises:

transmitting a continuous-wave radio signal 20 from the transmitting antenna of the at least one transceiver 1, the radio-transmission signal covering a monitored space 3, receiving, by the receiving antenna of the at least one transceiver 1, a return radio signal 30 reflected by at least one fixed object 5 and/or moving object 4 located inside the monitored space, processing the transmitted signal and the return signal, thereby producing a measurement range profile (step 40), wherein the range profile is an amplitude profile as a function of a distance from the receiving antenna of the transceiver, and subtracting a background range profile 41 representative of the monitored space with no moving objects 4, from the measurement range profile, to obtain an object range profile (step 50).

Figure 3:
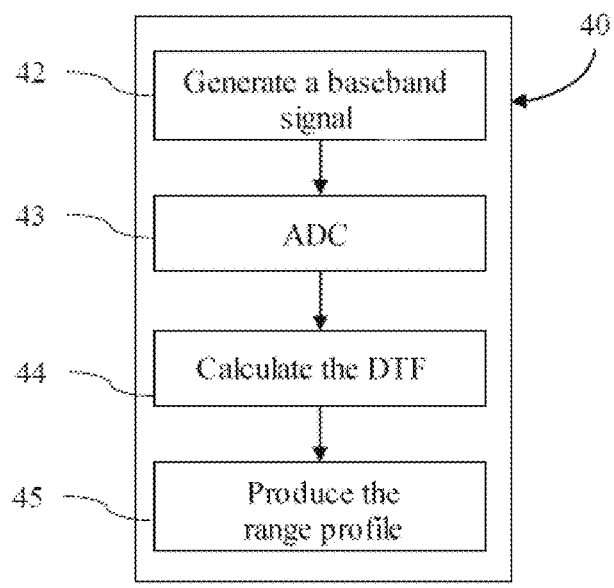
FIG. 3 is a flow chart that shows the step of producing a measurement range profile according to the method of FIG. 1.

Such signal processing is known per se and FIG. 3 shows an example thereof, concerning one embodiment in which the signal transmitted by the radar is an FMCW signal. In this embodiment, the transceiver 1 is configured to transmit a continuous wave with a linear frequency sweep, according to a known time function, and to receive a return signal reflected from a target. The production of the measurement range profile (step 40) comprises:

processing the return signal to produce a baseband signal (step 42). As is known per se, the return signal received from the receiving antenna is frequency-demodulated by a mixer (or demodulator) which beats the return signal with a copy if the transmission signal and is filtered with a low-pass filter that selects the difference frequency component to convert the (analog) return signal into a(n analog) baseband signal;

converting the analog baseband signal analog to digital, to obtain a digital baseband digital signal (analog-to-digital conversion, step 43), transforming the digital baseband signal in the time domain into a digital signal in the frequency domain by applying a Discrete Fourier transform (DFT) to thereby obtain a respective digital signal in the frequency transformation domain, i.e. an amplitude-frequency signal (step 44), and converting each frequency signal into a range profile by converting the frequency values into respective distance values (step 45).

As is known per se, the FMCW return signal 7 has substantially the same waveform as the transmitted signal 4, but it is picked up by a transceiver with a smaller signal amplitude as compared with the transmitted signal 4 and with a time delay given by the time that the signal takes to travel from a transceiver to the target 6 and from the target 6 to the same transceiver. The time delay generates a frequency difference Δf between the transmitted signal 4 and the return signal 7, which is indicative of the distance d of the target 6. If the transmitted signal 4 is modulated according to a frequency ramp having a duration T, increasing from a minimum value to a maximum value within a frequency range having a bandwidth BW, the distance d of a stationary target may be expressed as:

$$d = \frac{\Delta f \cdot v \cdot T}{2 \cdot BW}, \quad (1)$$

where v is the signal speed in the medium. For air applications, v corresponds to the speed of light c. The step 45 may use Eq. (1) to convert the signal frequency-difference values in the DFT domain (amplitude-frequency) into respective distance values to thereby obtain an amplitude-distance range profile.

In a further embodiment, the transceiver 1 is an SMCW transceiver configured to transmit a continuous-wave stepped-frequency modulated waveform transmission signal. As is generally known, the stepped-frequency transmission signal is composed of a sequence of spectral components having a constant frequency and duration Tone, in which the frequency of the components varies discreetly and with a constant pitch from a minimum frequency, $f_{min}$ to a maximum frequency $f_{max}$, in a frequency bandwidth BW. The SFCW transceiver receives a return signal and performs a phase demodulation by beating the received signal with a copy of the transmission signal and preferably by applying a low-pass filter to the select the component of interest. The received tones are thus converted into an analog baseband signal whose information is contained in the continuous zero-frequency component, because beat occurs between two signals having the same frequency, but different amplitudes and phases. For this purpose, each transceiver comprises a TX module, a RX module, a signal sweep generator for generating a continuous wave with a desired sequence of spectral components, a radio signal mixer and a low-pass analog filter. The steps of producing a measurement range profile are similar to those that are schematically shown in FIG. 3, the main differences therebetween being only indicated here:

when generating the baseband signal, filtering preferably only preserves the continuous component of the signal, the Fourier transform is an inverse transform (IDFT), and the transformation domain is a time domain, and the conversion from the profile in the time transformation domain into the measurement range profile comprises associating each time value t with a distance, d=ct, where c is the propagation speed of the radio signal, which in air is substantially equal to the speed of light.

In the present description and claims the term range profile is generally intended to mean an amplitude profile of a signal as a function of a distance from a receiving antenna of one or more transceivers.

Referring to FIG. 2, the step 50 of determining an object range profile by subtracting the background range profile from the measurement range profile uses, as a data input, a background range profile 41 that has been previously determined and stored.

In one embodiment, determining a background range profile 41 comprises performing an initial radar signal detection with no moving objects in the monitored space, to thereby obtain a background measurement range profile, which will be referred to hereinafter as background range profile. In this embodiment, the background range profile is determined according to steps 42 to 45 described with reference to FIG. 3 and stored in the control unit of the transceiver 1.

In another embodiment, determining a background range profile 41 comprises performing first and second radar signal detections, thereby calculating respective first and second measurement range profiles, calculating an average range profile of the first and second measurement range profiles as a background range profile to be subtracted from the second measurement range profile. After each additional radar detection, the background range profile is calculated as the average range profile of the plurality of measurement range profiles corresponding to a respective plurality of preceding distinct radar detections. The iterative calculation of background range profile as an average of preceding measurement range profiles may be performed on a sub-plurality of measurement range profiles, e.g. on the N measurement range profiles corresponding to the N last radar detections.

After performance of the radar detection (N+1), the background range profile defined by the average profile of the last N detections is subtracted from the measurement range profile (N+1) to obtain an object range profile associated with the radar detection (N+1).

A further background removal technique is range-Doppler separation. This technique is based on the fact that, if an object is moving, the frequency difference between the transmitted signal and the return signal, which is equal to the frequency of the baseband signal, is not only caused by the time delay between the signals, but also by the Doppler effect. The amount of the Doppler effect may be assessed using well-known techniques, e.g. by modulating the transmitted signal according to a triangular-wave frequency variation cycle. In this embodiment, determining the background range profile 41 comprises detecting the presence of a Doppler effect for each component of the measurement range profile, by comparing a measurement range profile obtained during the increasing ramp and a measurement range profile obtained during the decreasing ramp. Assuming that the detected object is moving and the background is only composed of stationary objects, the method comprises determining the background range profile as a component of the measurement range profile without Doppler effect, and subtracting this component from the measurement range profile to obtain the object range profile as a component of the measurement range profile subject to Doppler effect.

Referring again to FIG. 2, after the step 50, the method comprises analyzing the object range profile and identifying amplitude peaks representative of one or more detected objects. Preferably, an amplitude peak is deemed to be representative of a detected object if the signal amplitude of the peak is greater than one or more predetermined amplitude threshold values. If the step of analyzing results in the identification of at least one amplitude peak, a respective object distance value associated with the identified amplitude peak shall be stored (step 60).

In one embodiment, the amplitude threshold values are represented by a predetermined constant threshold value, which means that the amplitude values of the reference range profile are compared with a single amplitude threshold value.

Preferably, the threshold values are defined by a curve of threshold values versus the distance, the curve exponentially decreasing as the distance from the transceiver increases. An exponential decrease of the amplitude threshold values accounts for the fact that free-field propagating electromagnetic waves have an amplitude that exponentially decays with distance. Accordingly, the curve of amplitude threshold values allows distance value intervals to be classified as critical according to the size of the objects, substantially irrespective of the distance of the fixed objects.

It shall be noted an object range profile determined in a given radar detection does not necessarily have only one amplitude peak: there may be no amplitude peak, or the object range profile may comprise a plurality of amplitude peaks (above the threshold) and corresponding distances. The discussion hereinbelow assumes that the radar detection leads to the identification of at least one amplitude peak in the object range profile and hence that at least one moving object is detected.

In step 60 amplitude peaks (above the amplitude threshold value), as well as respective object distances associated with the peak values are identified, without distinction as to the origin of such amplitude peaks, i.e. as to whether they are moving objects foreign to the environment or if they are caused by shadow casting.

The position of the detected object is referred to hereinafter as object position and is defined by at least two values: an object distance value and an associated detection instant.

Preferably, the detection instant is defined by a time reference, i.e. a timestamp, e.g. a numeric code with a date and a time with a millisecond resolution or a numeric code that represents the number of milliseconds elapsed from an arbitrary time reference, e.g. the instant in which the transceiver is turned on.

The embodiment of FIG. 2 is particularly suitable for a "single target" detection mode. In this case, the control unit is configured to identify a single target that falls within the visual field of the transceiver and the step 60 of the method simply locates a single amplitude peak, and neglects any other peaks whose amplitude is greater than the amplitude threshold value. For example, if an object range profile comprises a plurality of amplitude peaks, the control unit analyzes the object range profile by identifying the maximum amplitude peak or, preferably, the peak that is closest to the transceiver, i.e. the peak associated with the shortest distance from the transceiver as compared with that of any other peaks. This is because, if a moving object casts a shadow for the signal transmitted by the radar on a fixed object, the shadow is more distant from the transceiver than the moving object. In the embodiment in which the transceiver is configured to detect the closest object in the presence of a real moving object and its shadow, the moving object that is closest to the transceiver would be detected rather than its shadow.

Once at least one object distance value associated with a possible moving object has been determined (step 60), the method comprises, after each radar detection, assessing the validity of the detected object (step 70a). In the embodiment of FIG. 2, the step 70a of assessing the validity comprises checking if the object distance value as determined in step 60 falls within the one or more intervals of critical distance values or is external to them (step 51).

If the object distance value is external to the one or more intervals of critical of distance values, then the object associated with the object distance value is determined to be valid, i.e. is validated (55). Since a signal change in a position in which there is no fixed object 5 cannot be caused by a shadow cast on a fixed object, amplitude peaks, external to the critical intervals are associated with "real" movable objects. After validation of the current object, the object position is stored in the control unit. Preferably, a validity code is associated with the object position and the object position is stored in association with the validity code.

In certain embodiments, if the current object is determined as being valid (55), the control unit is configured to emit a visual and/or acoustic alarm and/or is configured to transmit a signal indicative of the presence of an object in the monitored space to a remote system, e.g. an alarm panel, or a telecommunications network, as is known per se. In general, the control unit is configured to generate a presence signal, possibly after further checks.

If the object distance value is internal to one of the one or more critical intervals, the corresponding object might be either a shadow or a real moving object 4 very close to the fixed object 5 that falls within the interval of critical distance values. Then, the object is determined as "to be validated", i.e. it is classified at least temporarily as not valid, and its object position is stored. In this case, no validity code is associated with the object position, or otherwise a non-validity code is associated therewith.

If the current object has not been validated by the step 51, the control unit is preferably configured not to indicate the presence of the current object, i.e. to avoid detection of false positives.

In certain embodiments, if the object is classified as "to be validated" and the transceiver operates in a single target detection mode, for detecting a single target within the visual field, after the step 51, the control unit performs a check (step 52) to determine whether the current object has already been detected and if, based on the detections preceding the current detection, the current object can be validated.

The step 52 comprises a step 53 for checking whether there is at least one object position relative to a preceding detection performed at a detection instant $t_{k-i} < t_k$, $i=1, 2, \ldots (k-1)$, whose object distance value $d_{k-i}$ is external to all the critical intervals of distance values stored. If it is, the current object is determined as being valid because it has already been detected in a position that is not affected by possible shadows cast by fixed objects. Therefore, the object classification is changed from not valid to valid.

In one embodiment, prior to the step 53 or 54 (described below), the step 52 comprises selecting the object positions for the preceding measurements that can be associated with a significant probability with the current object, by selecting the object positions for respective time instants preceding the time instant of the current detection and separated from the latter by a time interval of less than or equal to a predetermined extinction time.

In a different embodiment, the control unit is configured to automatically delete from the memory the object positions whose detection times are separated from the current detection by a time interval greater than the extinction time. In this second embodiment, any object positions for preceding measurements stored in the memory are assumed to be always associated with the current object.

In one embodiment, which includes associating a validity code with the object position of a validated object and automatically deleting from the memory the object positions whose detection times are separated from the current detection time by a time interval greater than the extinction time, the step of verifying 53 comprises determining whether there exists in memory at least one object position previously detected by the current object position in association with the validity code. If there is, the current object is validated and the associated object position is stored in association with the validity code.

If the result of the checking step 53 is negative, the control unit is preferably configured to carry out a further check (step 54), by calculating the time of permanence of the current object in the interval of critical distance values. The check of step 54 is designed to determine whether the detected object, although placed at a critical distance, is a real object as it remains in the critical range for a given interval of time. The step 54 comprises analyzing the detection instants in which the object positions for the preceding measurements have been detected by determining the longest time interval between the current detection instant $t_k$ and the detection instant $t_{k-i} < t_k$ of a preceding object position. If the calculated observation time interval $\Delta t_i$ is greater than a predetermined threshold time value, indicated as the threshold value for the time of permanence, the current object is determined as being a valid target (55). The method proceeds with the validation of the object position of the current object and, preferably with the generation of a presence signal.

If the time interval is less than or equal to the threshold value for the time of permanence, then the detected object is classified "to be validated" and the checking program 70a ends (56). In one embodiment, the predetermined threshold time interval ranges from 200 ms to 5 s, more preferably from 300 ms to 2 s.

The steps (53) and (54) may be exchanged in order. The control unit may be configured to only execute one of the steps 53 and 54.

The step 10 of storing the critical intervals is preferably carried out only once, or anyway not cyclically at each radar detection. For example, the intervals of critical distance values may be provided as input data to the transceiver by an operator to be stored in the control unit of the radar system.

Figure 4:
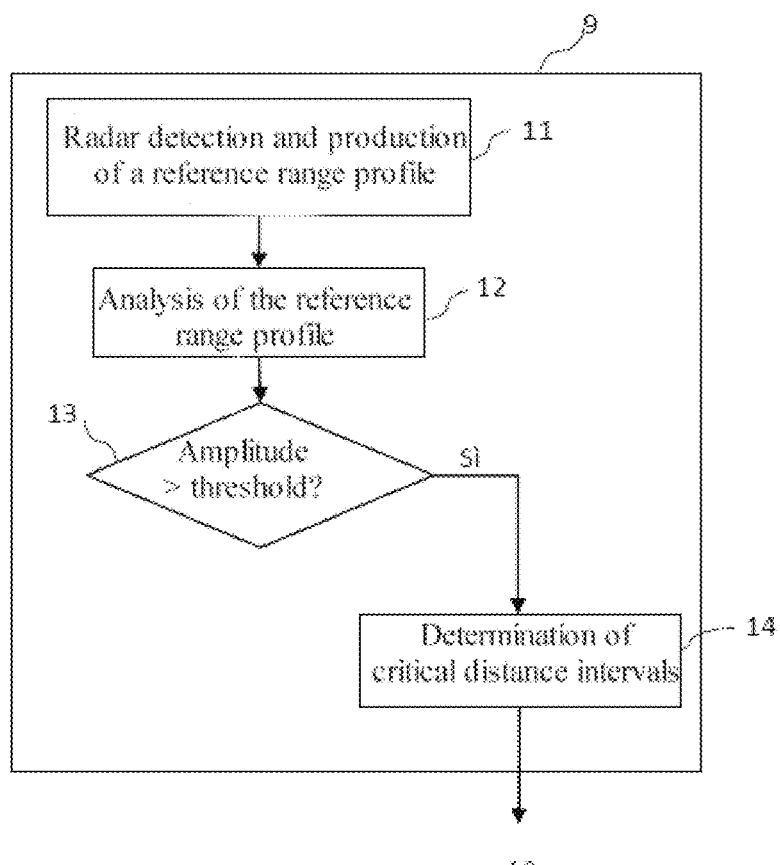
FIG. 4 is a flow chart that shows a step of storing intervals of critical distance values, according to a preferred embodiment.

In a preferred embodiment, the method comprises a step of determining critical intervals of distance values, prior to the step 10. FIG. 4 is a flow chart of a method of determining intervals of critical distance values, according to a preferred embodiment in which a transceiver determines the critical distance values during an initial radar detection when no foreign objects are present in the monitored space. The step of determining critical distance intervals may be carried out periodically to update the position of the critical intervals of distance values, for example, if the static scenario is changed, e.g. a piece of furniture is displaced or added in a residential environment. Updates to the critical distance intervals are performed when the radar system determines that the scenario is static, e.g. as a result of radar detections, or after receiving an external command, e.g. by an operator, to initialize the step.

The method 9 of determining the critical intervals of distance values comprises performing a radar detection, with no moving targets, to produce a reference range profile (step 11). The step 11 comprises the steps 40 and 50 described with reference to FIG. 2. After the production of a reference range profile, the step 9 comprises analyzing said range profile (step 12), wherein analyzing comprises: determining amplitude values greater than predetermined threshold values (step 13), the amplitude values exceeding the threshold values being associated with positions of fixed objects in the monitored space, and selecting respective critical distance values corresponding to respective amplitude values of the reference range profile that are greater than a threshold value (or of a curve of threshold values).

After the step 13 of analyzing the reference range profile that comprises selecting the critical distance values, the method 9 comprises determining critical distance intervals, each interval comprising a continuous sequence of critical distance values, representative of the position and extent of a fixed object.

It shall be noted that in the embodiment in which the background range profile 41 is determined by an initial radar detection with no moving targets, the reference range profile 11 may substantially coincide with the background range profile.

The Applicant found that, while the validation of a moving object associated with a position external to the critical distance intervals allows selection of detection data that is certainly representative of moving targets, thereby eliminating or at least substantially reducing the problem of false positives, the classification of each detected object at a distance that falls in an interval of critical distance values of the monitored space as invalid may generate false negatives. In a preferred embodiment, the method comprises identifying and tracking each object detected in the object range profile.

The term tracking of a moving object is intended to designate the detection of the spatial position of an object in time as a sequence of spatial positions in time to define a trajectory. Each trajectory comprises a sequence consisting of at least one object position defined by at least two values: an object distance value $d_k$ and an associated detection instant $t_k$. In one embodiment, the object position $p_k$ is defined by the pair of values $p_k=(d_k, t_k)$ and the spatial position in the observation space of the radar system coincides with the object distance value $d_k$. This is for example the case of the use of a single transceiver or a plurality of transceivers that are distant from one another (i.e. no or no significant overlap of the visual fields of the transceivers of the plurality).

In a different embodiment, as described in further detail hereinbelow, in which the radar system comprises a plurality of transceivers, with at least two adjacent transceivers having overlapping observation fields, the object position is defined by an object distance value, a detection angle value (e.g. azimuth angle) $\theta_k$ and a detection instant, $p_k=(d_k, \theta_k, t_k)$. In a further embodiment the object position is also defined by an angle of elevation.

If the spatial position is only defined by the distance, the trajectory is "one-dimensional" (moving away/toward), whereas in case of the object position $p_k=(d_k, \theta_k, t_k)$, the trajectory is two-dimensional as it also comprises the angular movement.

Each trajectory is associated with a trajectory code IDj representative of a j-th detected moving object, which is unique for that object.

By modeling the moving objects into trajectories, information concerning the same object during subsequent detections may be compared, with the possibility of determining with greater accuracy whether an object detected at an interval of critical distance values is a "real" object or a shadow. Further details about a method of tracking moving objects, according to one embodiment, are given hereinbelow with reference to FIG. 6.

Figure 5:
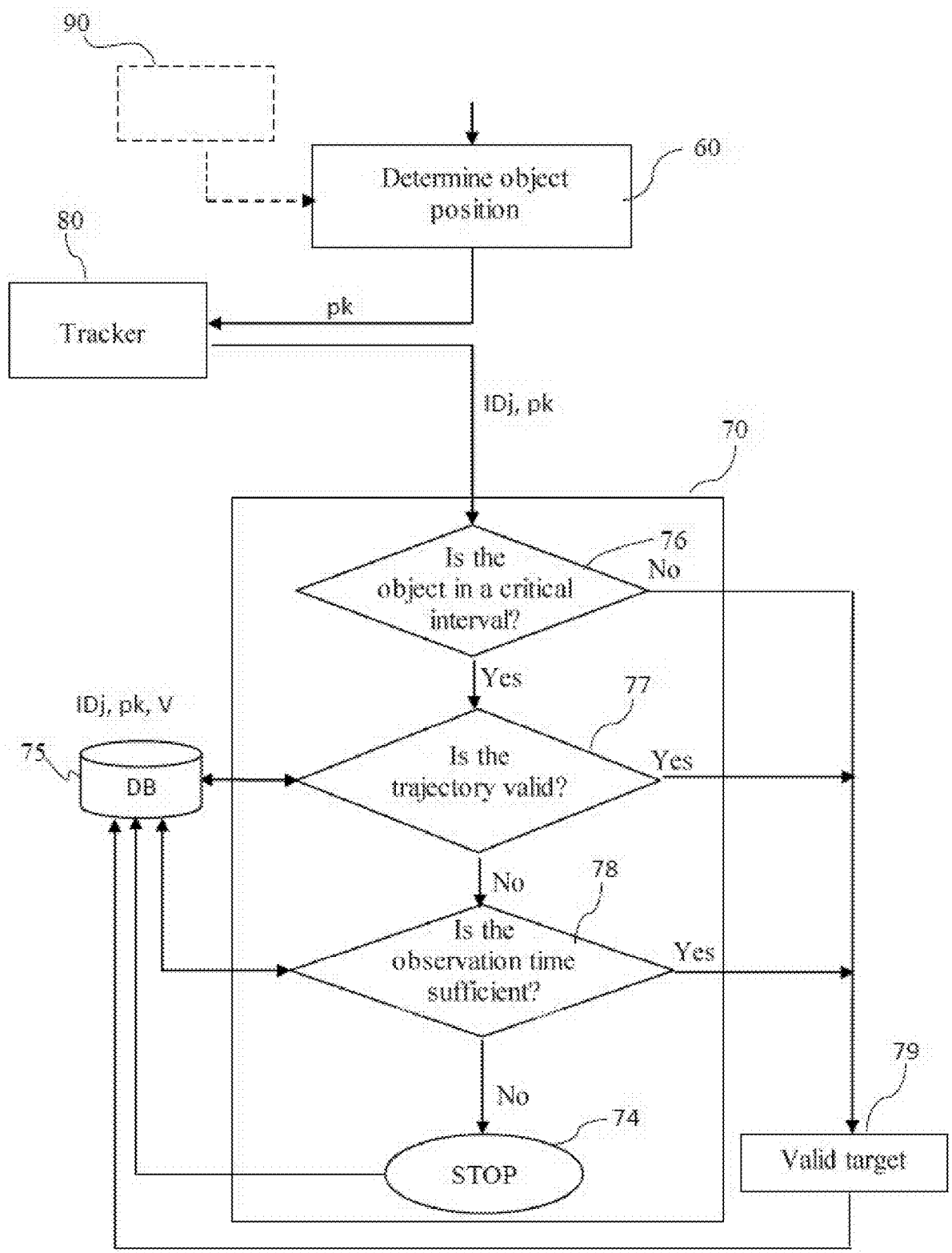
FIG. 5 shows a flow chart representative of a method according to a further embodiment of the invention.

FIG. 5 is a flow chart of a method of discriminating whether a moving object 4 in a monitored space 3 is a real object or a probable shadow, according to a preferred embodiment of the present invention, particularly suitable for radar systems that operate in a multiple-target radar detection mode. The method comprises performing a plurality of radar detections, including a current detection, each radar detection comprising a step 60 of determining the object position of one or more detected objects, after the steps 40 and 50 as described with reference to FIG. 2. Preferably, the control unit of the transceiver is configured for a multi-target radar detection and the step 60 comprises identifying each amplitude peak that (above the amplitude threshold value) thereby determining the corresponding object distance values.

In this description of the figure, reference will be made to a spatial position that is defined either by the distance only or in two-dimensions (e.g. distance and detection angle). The method of FIG. 5 comprises a step of tracking objects detected in distinct radar detections. The tracking step uses an automatic trajectory generator 80, i.e. a "tracker", implemented by a software program. Preferably all the detected objects are modeled into trajectories, i.e. each object detected in a radar detection is associated with an object trajectory that comprises at least one object position defined by a spatial position and an associated detection instant.

The method of FIG. 5 differs from the one described in FIG. 2 for the validity check algorithm 70, which uses the tracker 80, in this embodiment. After the step 60 of determining the object distance value of a j-th detected object, i.e. the current object, associated with a detection instant of the current detection, the method, implemented by a computer program, comprises transmitting the current object position $p_k$ to the tracker 80. The tracker 80 receives the current object position and compares it with the one or more previously stored trajectories, to assign a trajectory identification code, hereinafter referred to as trajectory code, to the current object position, preferably via similarity metrics.

The tracker 80 outputs the object position $p_k$ and an associated trajectory code IDj identifying the trajectory associated with the current j-th object and transmits the data (IDj, $p_k$) to the validity check algorithm 70 that checks the validity of the j-th object, which comprises at least one validity check step.

After reception of the data IDj and $p_k$, the method comprises a step 76 of checking whether the object position $p_k$ is external to or falls within an interval of critical distance values. If the result of step 76 is that the distance of the object is external to all the intervals of critical distance values stored in the memory during a previous step, e.g. step 10, the current object is validated (step 79) and the method proceeds with the assignment of a validity code, V, to the trajectory IDj and with the transmission of the data (IDj, $p_k$, V) to a first database 75 for storing the trajectories, with each stored trajectory being associated with the information about the validity status of the trajectory, i.e. as to whether the trajectory represents a valid object or not. Particularly, each trajectory is associated with a validity code V (step 79) if the object has been validated in a radar detection, or a "non validity" code, NV, if the detected object is still under observation because there was no way of establishing whether it is a real object or a shadow. It shall be understood that other implementations may be provided to indicate that a trajectory is validated. For example, a validation tag is assigned if a checking step has yielded a positive result, whereas the absence of a validation may be indicated by the absence of a tag associated with the trajectory.

The first database 75 is preferably a data structure, for example a lookup table formed by vectors associated with respective trajectories identified by a respective trajectory code ID and described by one or more object positions $(p_1, \ldots, p_k)$, in which the positions are for example defined by respective object distance values and timestamps. Each vector represents a trajectory and it may be given a validity code or, if admitted, a non-validity code.

If the result of the checking step 76 is that the distance of the object falls within an interval of critical distance values, the method proceeds with a checking step 77 if the current object is an object that has been already validated in at least one radar detection preceding the current detection. If an object that at the current detection instant is at a distance that falls within a critical interval, is nevertheless associated with a previously stored trajectory that has already been classified as valid, then the object is not a shadow, but a real moving object, at least with a high probability that generally depends on the accuracy of the tracking algorithm 80.

In one embodiment, the step 77 comprises querying the first database 75 to check whether the trajectory code IDj is present in the first database, i.e. identifies an existing trajectory, and if it does, such trajectory code identifies a valid trajectory, e.g. the trajectory code is assigned a validity code V.

If the result of step 77 is that IDj identifies an existing valid trajectory, the current object is determined as being valid (79) and the data (IDj, $p_k$, V) is transmitted and stored in the first database 75.

The steps (76) and (77) may be exchanged in order. After the step 60 and the association of the trajectory code, a check may be made as to whether the relevant trajectory has been classified as valid in at least one preceding detection (step 77), and only if it has not been classified as such the object position can be compared with the one or more critical intervals (step 76). In this embodiment, not shown, the data (IDj, $p_k$) output by the tracker 80 is transmitted to the first database 75. The method proceeds by querying the first database 75 to check whether the trajectory code IDj identifies a valid trajectory. If it doesn't, the method proceeds to check whether the object position $p_k$ is external to or falls within an interval of critical distance values.

It will be appreciated that the execution of step 76 does not necessarily require the knowledge of the identification code of the current object position.

If the result of step 77 is that there was no way of associating the current object with an existing trajectory or the object is associated with an existing and not (yet) validated trajectory, the process 70 of checking the validity of the detected object preferably comprises a step 78 of checking whether the detected object is present within an interval of critical distance values for a time that is longer than a predetermined threshold value for the time of permanence. Step 78 comprises storing the object position at the instant $t_k$ and check, by querying the first database 75, whether the trajectory IDj is an existing trajectory that comprises at least one object position $p_{k-i}$ in the critical range and was detected at an instant $t_{k-i}$ (i=1, 2, ... (k−1) preceding the current detection instant $t_k$ and, if it was, calculating an observation time interval between the two instants and comparing the observation time interval with the predetermined threshold value, and if the observation time interval is greater than the threshold value for the time of permanence, the current object is validated (79).

In practice, in one embodiment, when a new trajectory code is assigned to an object position by the tracker 80, a timer is initialized which will indicate, in the subsequent detections that can be associated with the same trajectory code, how long the detected object falls within a critical interval of distance values. In one embodiment, successive proximate detections are temporally spaced by a time interval of time $\Delta t$ and the observation time is a multiple of $\Delta t$, $n\Delta t$, with n being an integer. Each time the $\Delta t$ timer is increased, a radar detection is performed to determine an object position.

After validation of the current object, a validity code is assigned to the trajectory IDj and the data (IDj, $p_k$, V) is stored in the first database 75. It shall be noted that the validity code is assigned to the trajectory and hence to all the object positions of the trajectory, including any object positions detected at instants preceding $t_k$.

If the observation time interval is shorter than or equal to the threshold value for the time of permanence, the current object is classified "to be validated" and the validity check program 70 ends (74) and proceeds with the storage of data (IDj, $p_k$) in the first database 75 without assigning a validity code to this data (or assigning a code NV that indicates that the object is yet to be validated). The validity of the object may be assessed in case of subsequent radar detections that can be associated with the same trajectory code.

The threshold value for the time of permanence preferably ranges from 200 ms to 5 s, more preferably from 300 ms to 2 s.

The observation of the detected object for one observation time interval before validation of an object in a critical interval can prevent a considerable number of false alarms derived from shadows that remain for a short time on a fixed object represented by a critical interval of distance values. In certain embodiments, the step 78 can classify as valid a "new" object detected as a real moving object even though it falls within a critical interval, although with a time delay that is equal to the predetermined threshold value for the time of permanence. This will afford detection of an intruder who passes through the monitored space and moves at the critical intervals (furniture, etc.) to avoid radar control by being mistaken for a shadow.

In certain embodiments, the order of execution of the steps 76, 77 and 78 may be different from the one as shown in FIG. 5. One object and the relevant trajectory are deemed to be valid if at least one of the following conditions is met: the object is placed external to each interval of critical values (step 76), the trajectory has been validated earlier (step 77), and the permanence in a critical interval of distance values exceeds a predetermined threshold value for the time of permanence (step 78). Irrespective of the order of execution of the checking steps of step 70, the fulfillment of at least one of the three above conditions is sufficient.

In one embodiment, the method comprises, after step 79, the generation of a presence signal, possibly after the execution of one or more automatic checks for classifying the movement (human, measurement error, a window, etc.) or to understand whether the detected object is in the permitted zone of the environment being monitored.

Figure 6:
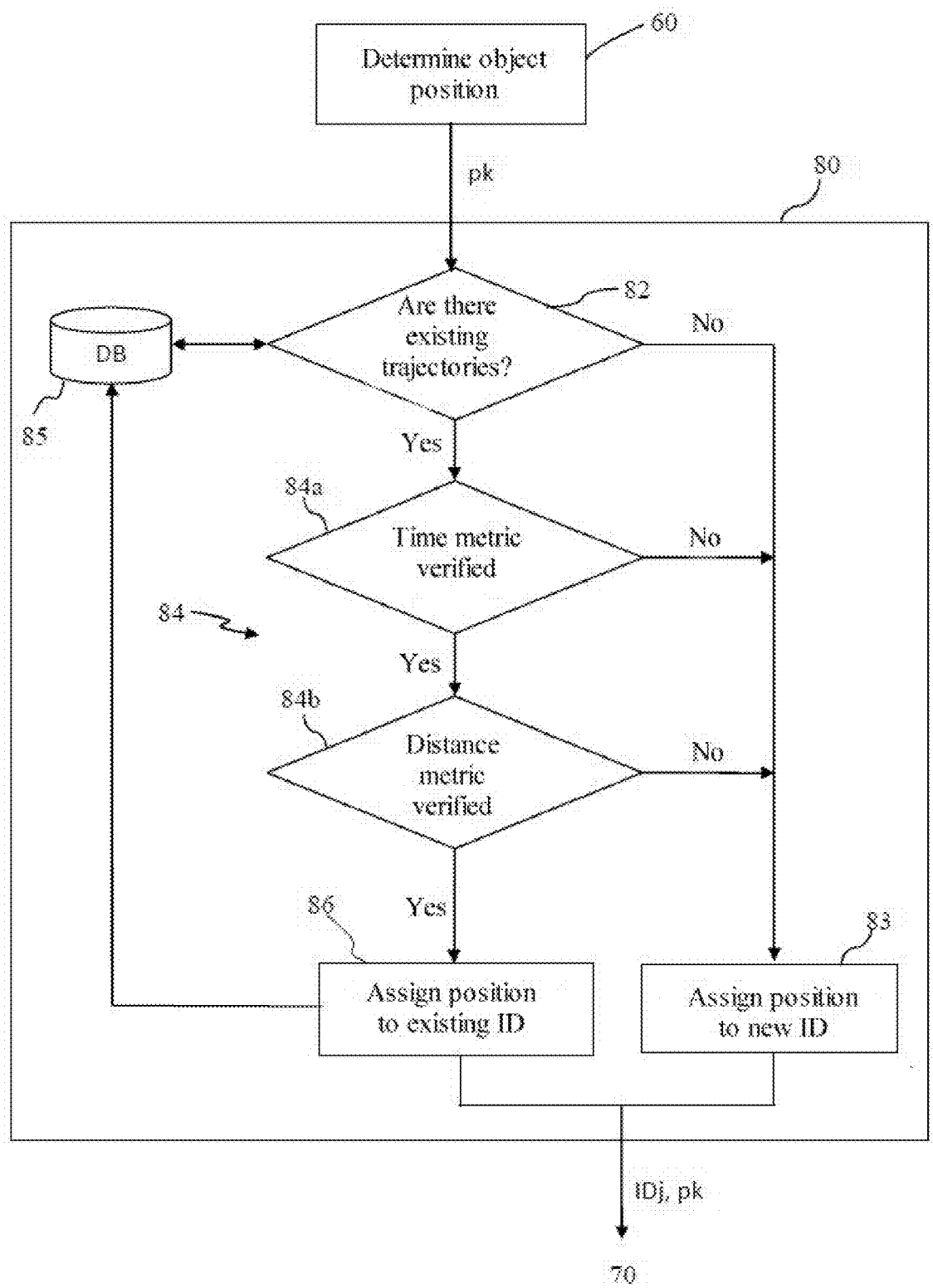
FIG. 6 is a flow chart that shows a tracking method to identify trajectories of objects detected by a radar system, according to one embodiment.

FIG. 6 is a flow chart of a method of tracking moving objects, in a multi-target radar detection mode, according to one embodiment. Advantageously, target identification and tracking also allows discrimination between simultaneously detected objects. Reference will be made hereinafter to a single detected object, i.e. a single object position identified in the object range profile of the current object. It shall be understood that, if the current radar detection detects a plurality of objects, the steps of the method of estimating the trajectories 80 are carried for each detected object.

The tracker 80 receives an input with an object position $p_k$ associated with the object detected at a current detection instant $t_k$ (step 60 in FIG. 5). Preferably, the object positions received from step 60 are stored in a second database 85 such that each trajectory of the i-th, j-th, m-th, etc. object will be associated with a respective trajectory code IDi, IDj IDm, etc. The second database 85 is preferably a data structure, for example a lookup table formed by vectors associated with respective trajectories identified by a respective trajectory code ID and described by one or more object positions ($p_1, \ldots, p_k$), for example defined by respective object distance values and timestamps. Each vector of the second database 85 represents a trajectory.

A trajectory is the path that a moving object follows in space in a time-dependent manner and is a set of time-sorted object positions. The trajectory code is uniquely associated with a detected object, i.e. there are no two distinctly detected objects simultaneously associated with the same ID. For example, objects detected in the same detection are associated with different trajectories and are then associated with different identification codes and interpreted as distinct objects.

The tracking method implemented by the tracker 80 comprises, after reception of the object position $p_k$, a step 82 of checking whether the DB 85 stores at least one trajectory (ID, object position/s). If no trajectory is stored, for instance upon power-on of the radar system, the method proceeds with the assignment of a new trajectory code to the current object position by generating a new trajectory (83).

Any existing trajectories consist of object positions for detections preceding the current detection. The existing object trajectories are generated with the same method for the current detection (e.g. steps 10 to 60), at an instant in which the respective trajectory origin detections were considered the current detection.

If the second database 85 stores at least one trajectory identified by a trajectory code, the method proceeds to a step 84 of checking whether the object position $p_k$, received as an input, belongs to one of the at least one stored trajectory or not.

Step 84 comprises a first step 84a of calculating a metric for the tracking time between of the object position $p_k$ and the object positions stored in the second database 85. In one embodiment, the tracking time metric checks whether the time interval between the detection instant $t_k$, e.g. the timestamp, of the current object position and the timestamps of the object positions for each stored trajectory is shorter than a predetermined extinction time value. Preferably, the checking step 84a comprises comparing the timestamp of the current object position with the maximum timestamps $(T_{max})_m$, i.e. for the last detection in order of time for each trajectory $ID_M$, m=1, 2, . . . , M (M number of stored trajectories). If the time interval between the current timestamp and the $(t_{max})_m$ is greater than the extinction time value for the respective maximum timestamps of the object positions for the last detection for each trajectory $ID_m$, then the object is deemed not to belong to any of the trajectories stored in the database (DB) 85.

For example, if the time interval after the last detection instant is longer than the predetermined value for the extinction time, the stored trajectories are "broken", and are preferably deleted from the memory. This is the case, for example, in which the target associated with that trajectory is no longer visible, and may be thus deemed to be "extinct".

In one embodiment, the extinction time value ranges from 1 to 10 seconds.

If the result of step 84a is that the object does not belong to any of the trajectories stored in DB 85, then the method associates a new trajectory code to the object position of the current detected object (step 83). The new trajectory code and the associated object position are transmitted and stored in the DB 85.

If the result of step 84a is that the current object position is compatible in time with at least one of the trajectories stored in DB 85, the checking step 84 proceeds to a step 84b of calculating a metric for the distance between the current object position and the object positions of the at least one trajectory. The checking step 84b comprises selecting the at least one trajectory $ID_m$ that comprises of the object position with the timestamp $(T_{max})_m$ that is closest to $t_k$ and comparing the object distance value of the current object position with the object distance value of the object position at $(T_{max})_m$. If the difference between the object distance value and the distance value associated with $(T_{max})_m$ is greater than a predetermined distance threshold value, then the detected object is deemed to be too far away to the last position of the at least one selected trajectory and thus cannot be associated with the trajectory $ID_m$. In this case, a new trajectory is generated (step 83), which is defined by a new trajectory code.

Conversely, if the detected object is determined as being sufficiently close to the at least one selected trajectory, for instance at a distance less than 1 meter, the current object position is assigned the trajectory code of the selected trajectory (step 86).

The distance checking step (84*b*) can distinguish and track the movements of a plurality of objects that are simultaneously present in the monitored space. A plurality of trajectories may be stored in the memory, and each object detected in the current detection is later compared with distinct stored trajectories up until a compatible trajectory, if any, is found.

The position of the current object is stored in DB 85 to update an existing trajectory or to generate a new trajectory.

The above discussed method of tracking the detected objects may be effective when the object position is only represented by an object distance, or by an object distance, a detection angle, and optionally an angle of elevation. In the former case, the position is a scalar quantity in space (i.e. distance $d_k$), while in the latter case the position is a vector quantity. In one embodiment, the two-dimensional position in the detection plane (x,y) is defined by $(x_k, Y_k)$ with $x_k = d_k \cdot \cos(0_k)$ and $y = d_k \cdot \sin(0_k)$ and of the object position $p_k = (d_k \cdot \cos(0_k), d_k \cdot \sin(0_k), T_k)$.

The tracking method 80 outputs a trajectory code IDj of the trajectory of the detected current object (steps 83 or 86) associated with the object position $p_k$ as determined in object range profile. The output data (IDj, $p_k$) is input for carrying out the step 70 of validating the detected object (FIG. 5).

Figure 7:
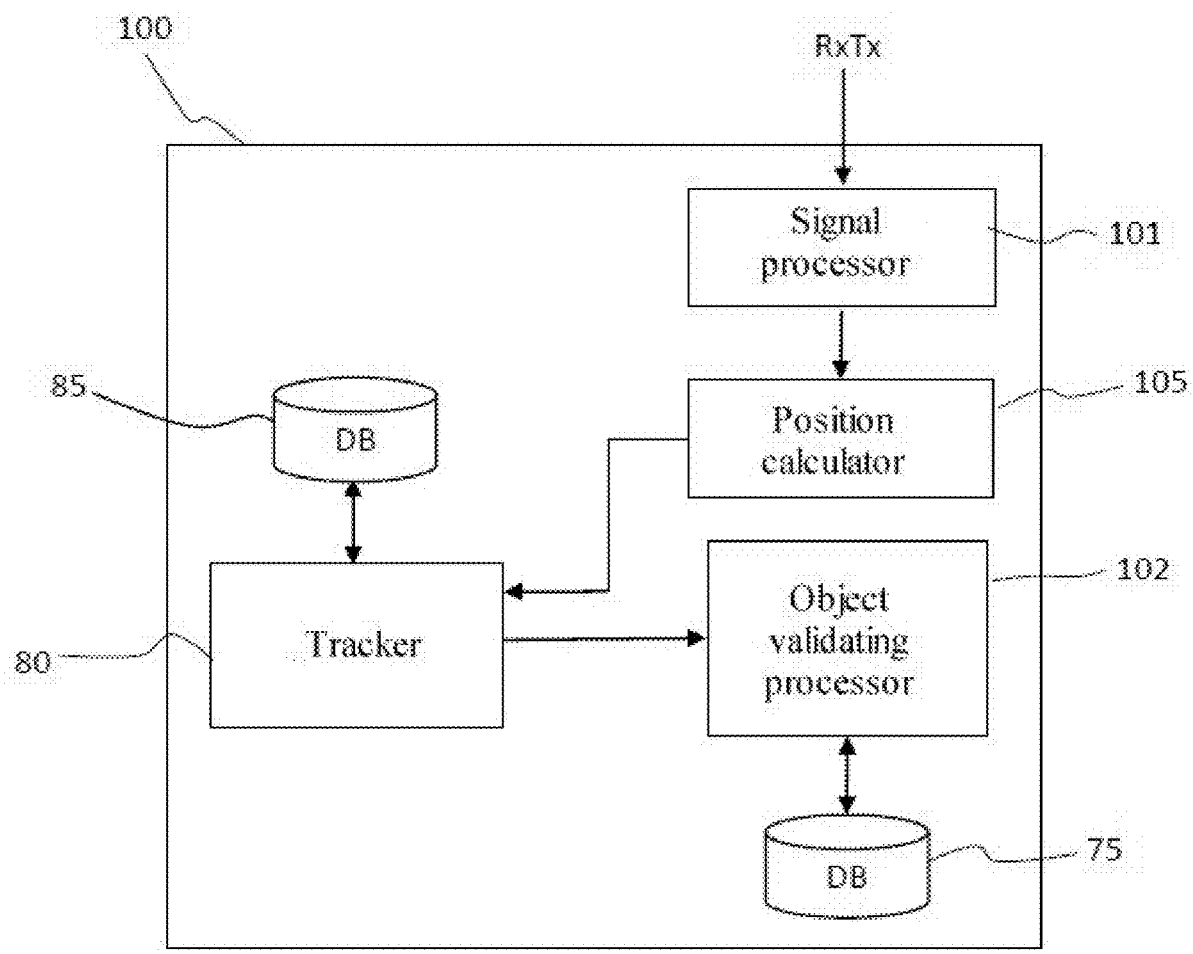
FIG. 7 is a block diagram of a control unit that is logically connected to at least one radar transceiver and is configured to carry out a method according to the present invention.

FIG. 7 is a block diagram of a control unit which implements a method according to one embodiment of the invention. The control unit 100, that comprises one or more processors configured to perform software programs, is logically connected with one or more TxRx transceivers and can receive data from each transceiver, process data and transmit commands to the transceivers. The control unit 100 comprises a signal processor 101 which is configured to receive signals from each transceiver and to produce a respective object range profile. While commercial FMCW and SFCW transceivers are typically configured to output a baseband signal, in the present invention each transceiver may output the transmitted signal and the return signal and the signal processor 101 may be configured to produce a baseband signal for each transceiver. The signal processor 101 is also configured to acquire a background baseband signal and to store a background range profile and to output an object range profile (steps 40 and 50). The control unit 100 comprises a position calculator 105 logically connected to the signal processor 101 and configured to determine the object position based on the object range profile. The position calculator 105 is logically connected with a tracker 80 for transmitting the object position to the tracker 80. The tracker 80 is configured to identify a trajectory that contains the received object position and is logically connected to an object validating processor 102 to discriminate whether the detected object is a real object or a shadow (step 70*a* or 70). The tracker 80 is connected to a second database 85 for storing the trajectories as a sequence of object positions, each trajectory being identified by a unique trajectory code.

The object validating processor 102 is logically connected to a first database 75 for entering and storing the trajectories identified by a respective trajectory code, which is assigned a validity code or a different code that indicates that the trajectory is yet to be validated.

FIG. 8 shows a radar system according to a further embodiment. The radar system comprises a plurality of transceivers 1*a*, 1*b*, 1*c*, and for each detected object, a detection angle, for example the azimuth angle may be determined, in addition to a distance. Preferably, the transceivers of the plurality of transceivers 1*a*, 1*b* and 1*c* are so arranged that respective main transmission directions 2*a*, 2*b*, 2*c* of each transceiver lie on a common plane, referred to hereinafter as detection plane. The transceivers are connected to a control unit 100, which is described, for example, with reference to FIG. 7.

Preferably, the main transmission direction 2*a*, 2*b*, 2*c* of each transceiver is the maximum radiation direction and the respective maximum radiation directions of each transceiver substantially lie on a common plane, i.e. the detection plane. The term "substantially", in the context of the common plane for the plurality of transceivers, is intended to indicate that the maximum radiation directions of can may on coincident or at least incident planes, that form such a small angle as to have a very small gain difference between the transmitting antennas of the transceivers.

Figure 9:
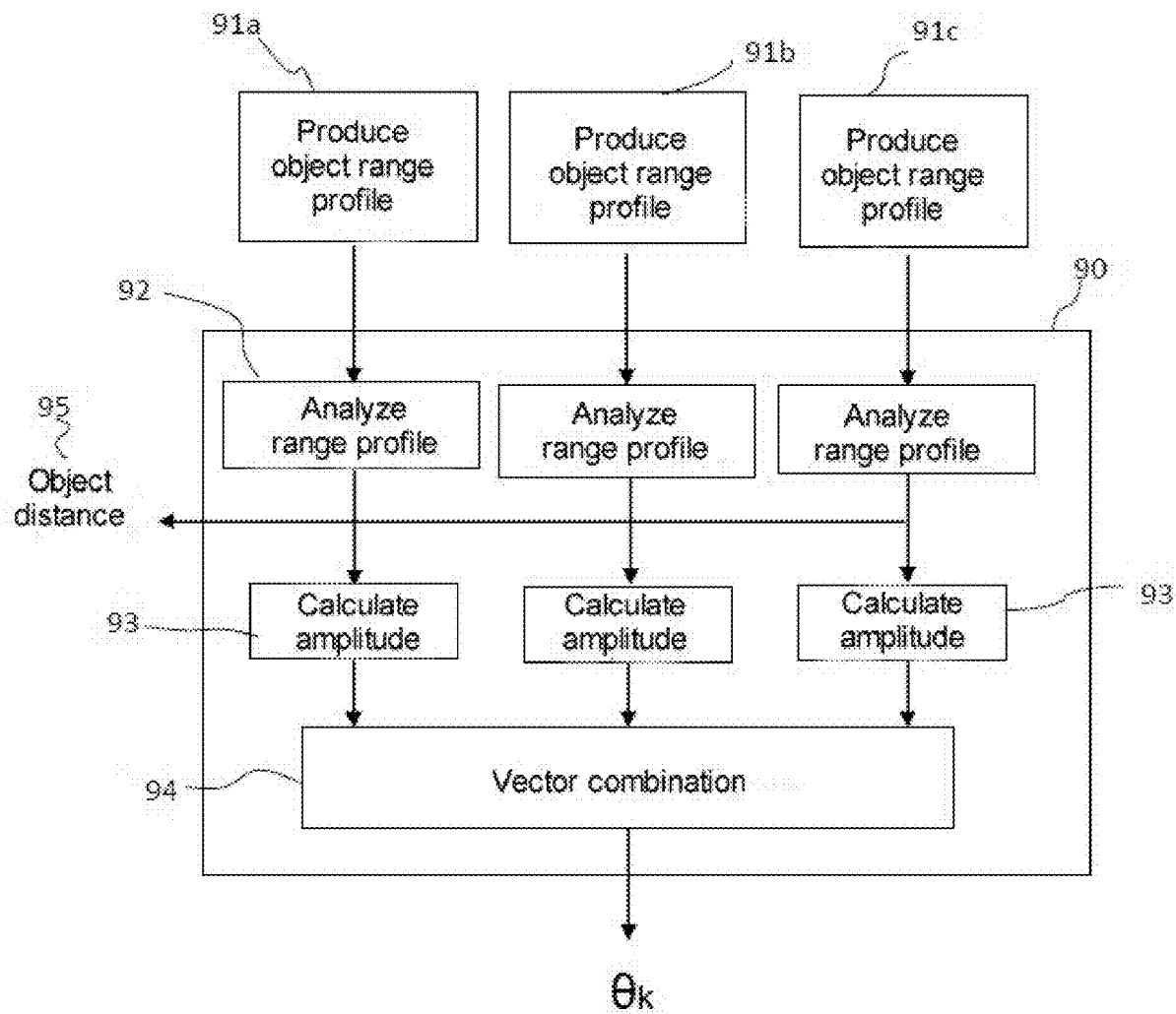
FIG. 9 is a flow chart of a method of determining a direction angle of a moving object to define the object position of a moving object.

The main transmission directions 2*a*, 2*b*, 2*c* of the distinct transceivers 1*a*, 1*b*, 1*c* are different from and particularly incident on each other. In a preferred embodiment, as shown in FIG. 9, the radar system comprises three radar transceivers which are angularly equally spaced from each other at an angle ranging from 30° to 60°, preferably of 45°, between the main transmission direction of the central transceiver 1*b* and the main transmission direction of the respective transceiver adjacent thereto 1*a* and 1*c*.

The main transmission directions 2*a*, 2*b*, 2*c* of the plurality of radar transceivers 2*a*, 2*b*, 2*c* are incident on each other and cross at a single point P, behind the radar transceivers 1*a*, 1*b*, 1*c*.

In a preferred embodiment, the detection plane is the azimuthal plane of the respective transmitting (or transmitting/receiving) antenna of the transceivers.

Each transceiver transmits radio signals that cover a visual field 3*a*, 3*b*, 3*c* with a main transmission direction 2*a*, 2*b*, 2*c*, the visual fields of adjacent transceivers of the plurality of transceivers being in a partially overlapped relationship. The visual fields form together the space monitored by the radar system.

The control unit 100 stores respective intervals of critical distance values (step 10) for each transceiver. In the example of FIG. 8, the object 4 is detected by the transceivers 1*a* and 1*b* and the fixed object 5 is present in the visual fields of both transceivers.

Preferably, the visual field of each transceiver, for instance the visual field 3*a* of the transceiver 1*a*, angularly extends at least to the main transmission direction 2*b* of an adjacent transceiver 1*b*. Thus, at least half of the visual field 3*a* of a transceiver 1*a* overlaps at least half of the visual field 3*b* of a transceiver 1*b* adjacent thereto.

Preferably, the coverage angle of the radar system is greater than or equal to 90°, more preferably greater than or equal to 120°, even more preferably ranging from 140° to 360°, the coverage value at least partially depending on the number of transceivers of the radar system. In a particularly preferred embodiment, the coverage angle ranges from 120° to 180°.

Preferably, each transceiver 1*a*, 1*b*, 1*c* has a visual field 3*a*, 3*b*, 3*c* with an aperture angle of at least 60°, in one embodiment ranging from 60° to 180°.

Preferably, the transceivers of the plurality of transceivers are arranged close to each other such that the distances of an object detected in the space monitored by two adjacent transceivers are substantially equal. In the embodiment of FIG. 8, preferably, the arrangement of the transceivers in the radar system is such that the distance of a target from the transceivers is substantially the same for each transceiver 1*a*, 1*b*, 1*c*.

Preferably, each transceiver is configured to have a standby mode and an operating mode (or detection mode) and is configured to switch between the two modes. In the stand-by mode, the transceiver is not used to transmit and receive signals for detecting a target (e.g the transceiver is OFF or is configured to generate low-power signals). In the operating mode, the transceiver transmits a radio signal at such a power as to allow detection of an object in its visual field. Preferably, the control unit 100 is configured to sequentially actuate the transceivers. Once a sequence of actuation of all the radar transceivers has been completed, the direction of an object 4 is calculated as described below, and the control unit is configured to move to a new sequence.

The direction of the object 4 in the detection plane relative to the radar system 1 is obtained through a combination of vectors representative of the return signals received from the respective radar transceivers. Namely, the direction of the target 4 is determined, as the direction of a vector represented by a direction angle θ in the detection plane in which the main transmission directions of the transceivers 1a, 1b, 1c lie. The direction angle is the angle formed by the direction of the vector relative to a reference direction.

A preferred method 90 of determining a detection angle is schematically illustrated in FIG. 9, which is a flow chart for the processing of the signals picked up by a plurality of radar transceivers to obtain the direction θ of a target, according to one embodiment of the present invention in which the transceivers transmit a FMCW or SFDW radio-frequency signal. Although the method of FIG. 9 is implemented by a system with three transceivers, the description of this figure will also apply to a system with N transceivers, N≥2.

The baseband signals from each transceiver 1a, 1b, 1c are processed to obtain a respective object range profile (steps 91a, 91b, 91c), for instance according to a method of processing the signals as described with reference to FIG. 3 and as shown in FIG. 1 by step 50. The object range profiles are transmitted to the position calculator 105 that implements a method 90 of determining the distance and the estimation of the direction angle of the detected object. Upon receipt of the range profiles object, the method 90 has a step 92 of analyzing each range profile by selecting one or more amplitude peaks values of the above-threshold signal. After step 91, the control unit is configured to determine the distance of a target from each transceiver that has received a return signal, i.e. from each transceiver that has detected one or more objects, from the analysis of the respective object range profile. If a transceiver detects one target only, a single above-threshold amplitude peak will be found in the object range profile and an object distance value will be determined for each transceiver that has detected the object. If the transceiver detects a plurality of targets, the object range profile will comprise a plurality of peaks above the threshold and a respective plurality of distances. While reference will be made hereinafter to one detected object, i.e., the current object detected in the current detection, the discussed method also applies to a multi-target case.

In one embodiment, the distance associated with the current object is calculated as an average value of the distances associated with the transceivers that have detected the current object (i.e. excluding the transceivers that do not see the object) and this average value is associated with the object distance $d_k$ of the current object (step 95). If the target is detected by more than one transceiver, the calculation of the average value reduces measurement errors.

In a further embodiment, the distance $d_k$ associated with the current object is the distance as determined by analyzing the object range profile of a single transceiver that has detected the object. For example, the control unit is configured to select the shortest object distance, i.e. is the transceiver that sees the closest object.

The control unit (in the calculator unit 105) is configured to analyze each object range profile (step 92) to determine a respective scalar amplitude value $s_1$, $s_2$, $s_3$ of the object range profile associated with each of the transceivers (step 93), indicated by a signal amplitude value. If one object 4 only has been detected in the space monitored by the radar system, a single signal amplitude value is calculated for each transceiver that sees the target, e.g. the amplitude of the peak that is closest to each transceiver. If two or more transceivers detect a plurality of targets at distinct distances, respective scalar signal amplitude values are determined for each target.

In one embodiment, the signal amplitude value $s_1$, $s_2$, $s_3$ is calculated as the area subtended by the signal in an interval of distances (which preferably comprises the object distance $d_k$) selected by windowing, i.e. as the integral of the amplitude values in a window of amplitude values of the object range profile. If the distance interval is a sufficiently narrow interval, the signal amplitude is determined as the integral of a single peak of object range profile, e.g. the main component representative of the current object.

In the multi-target case, for each object detected by each transceiver, the signal amplitude value $s_1$, $s_2$, $s_3$ is calculated by selecting a respective identical interval of distances for each transceiver in the respective object range profile and by calculating the signal amplitude value to thereby obtain three values ($s_1$, $s_2$, $s_3$) for each moving object.

In the preferred embodiments, a signal vector of the signal is defined in the detection plane along the main transmission direction of the signals for each transceiver of the system, with the vector having the respective signal amplitude $s_1$, $s_2$, $s_3$ as its modulus and the main transmission direction as its direction.

Preferably, the control unit 100 is configured to receive and store a transmission direction unit vector $\vec{n}_i$, i=1, . . . , N (N being the number of transceivers), i.e. a two-dimensional vector having a unit modulus associated with each transceiver of the plurality of radar transceivers. The direction of transmission direction unit vector in the detection plane coincides with the main transmission direction 2a, 2b, 2c of its respective transceiver. Preferably, the main transmission direction of each transceiver is the maximum radiation direction of the transmitting antenna of the respective transceiver and each unit vector is defined by the maximum radiation direction, e.g. the direction perpendicular to the plane of the antennas in case of transceivers with planar antennas. The signal vector of the i-th transceiver is defined by $\vec{V}_i = \vec{n}_i \cdot s_i$.

The N transmission unit vectors are stored prior to step 94.

The direction of a moving object is estimated based on a vector combination of the signal vectors associated with the transceivers, each transceiver contributing to the direction according to the modulus of its vector (step 94). After the step 93 of calculating the signal amplitude value for every transceiver and after storage of a transmission unit vector $\vec{n}_i$ associated with each transceiver, the method comprises calculating the direction of an average signal vector $\vec{V}_m$ calculated as the average of the signal vectors $\vec{V}_i$, i.e.

$$\vec{V}_m = \frac{1}{N}\sum_{i=1}^{N} \vec{n}_i \cdot s_i$$

(step 94).

Preferably, the direction of the target is defined by a direction angle $\theta_k$ relative to a reference direction, with the direction angle being estimated by calculating the phase of the mean vector obtained by the vector combination of vectors $\vec{V}_i$ according to the following equation:

$$\theta_k = \varphi\left(\frac{1}{N}\sum_{i=1}^{N}\vec{n}_i \cdot s_i\right) = \varphi\left(\frac{1}{N}\sum_{i=1}^{N}\vec{V}_i\right) = \varphi(\vec{V_m}), \quad (2)$$

Equation (2) provides an estimate of the angle $\theta_k$ if the target is simultaneously observed by at least two radar transceivers.

In this embodiment, the k-th object position $p_k$ of an object in the detection plane at a detection instant $t_k$, is defined by the direction angle $\theta_k$, calculated by means of Eq. (2), and by the distance $d_k$ of the object from the radar system (step 95).

Preferably, a transmission unit vector associated with a transceiver of the plurality of transceivers defines a reference direction of the radar system. The reference direction extends along an axis of an arbitrary Cartesian reference system, i.e. is at 0° in such reference system. Therefore, the transmission unit vector that defines the reference direction is $\vec{n}_1 = \vec{n}_r = (0.1)$ or $(1.0)$.

In the example of FIG. 8 and in one embodiment in which the two lateral transceivers 1a and 1c are arranged such that their main transmission direction is at an angle of about −45° and +45° relative to the main transmission direction of the central transceiver 1b, the unit vector $\vec{n}_r$ is the transmission unit vector associated with the central transceiver 1b, the unit vector associated with the transceiver 1a is $$\left(\frac{\sqrt{2}}{2}, \frac{\sqrt{2}}{2}\right).$$

and the unit vector associated with the transceiver 1c is $$\left(\frac{-\sqrt{2}}{2}, \frac{\sqrt{2}}{2}\right)$$

In FIG. 5, a broken line designates the step 90 which, according to one embodiment, outputs the current direction angle $\theta_k$ to thereby determine, with the object distance, the object position $p_k$.

It shall be noted that even when a plurality of transceivers 1a, 1b, 1c are employed, the tracking algorithm may be implemented (step 80), and generates trajectories in which the object positions are only represented by object distances. In other words, here the signals picked up by distinct transceivers 1a, 1b, 1c are processed separately from each other and distinct trajectories are generated relative to distinct transceivers 1a, 1b, 1c.

A skilled person may obviously envisage a number of changes to the above described embodiments, without departure from the scope of the appended claims.

The invention claimed is:

1. A method for identifying a moving object inside a space monitored by at least one radar transceiver configured for transmitting and receiving continuous wave radio signals, at least one fixed object which reflects the radio signals being present in the monitored space, the method comprising:
   storing one or more critical intervals of distance values from the transceiver, the critical intervals being associated with a position of the at least one fixed object in the monitored space;
   performing a plurality of radar detections which comprises a current radar detection at a current detection instant $t_k$ and at least one previous radar detection performed at a detection instant $t_{k-i}$ preceding the current detection instant $t_k$, every radar detection comprising:
   a) transmitting a continuous wave radio signal by the at least one transceiver;
   b) receiving by the at least one transceiver a return radio signal reflected by at least one object located inside the monitored space;
   c) processing the transmitted radio signal and the return radio signal for producing a measurement range profile, wherein the measurement range profile is a profile of amplitude as a function of a distance from the transceiver; and
   d) subtracting from the measurement range profile a background range profile, representative of the monitored space in an absence of moving objects, so as to obtain an object range profile;
   analyzing the object range profile relative to the current radar detection by searching for amplitude peaks and respective associated distance values, identifying an amplitude peak that represents a current object detected, and selecting an object distance value $d_k$ corresponding with the identified amplitude peak;
   storing an object position $p_k$ which comprises the object distance value $d_k$ and the current detection instant $t_k$;
   assessing validity of the current object, wherein assessing the validity comprises:
   determining whether the object distance value $d_k$ of the current object is internal or external to the one or more critical intervals of distance values;
   if the object distance value $d_k$ of the current object is external to the one or more critical intervals of distance values, classifying the current object as valid so as to identify the current object as a moving object in the monitored space; and
   if the object distance value $d_k$ of the current object is internal to the one or more critical intervals of distance values, classifying at least temporarily the current object as not valid so as to identify the current object as a fixed object in the monitored space;
   wherein the method further comprises, before performing the current radar detection:
   analyzing the object range profile relative to the at least one previous radar detection by selecting an object distance value $d_{k-i}$ corresponding with a respective amplitude peak in the object range profile that represents a previously detected object; and
   storing at least one object position $p_{k-i}$, which is relative to the at least one previous radar detection and which comprises the object distance value $d_{k-i}$ and the detection instant $t_{k-i}$;
   wherein the method further comprises, during the current radar detection:
   assessing whether the current object corresponds to the previously detected object; and
   wherein assessing the validity of the current object further comprises:

if the current object was classified at least temporarily as not valid, calculating at least one observation time interval defined by a difference between the current detection instant $t_k$ and the at least one previous detection instant $t_{k-i}$, determining whether the at least one observation time interval s greater than a predetermined threshold value for time of permanence in the one or more critical intervals of distance values, if the at least one observation time interval is greater than the predetermined threshold value, changing the classification of the current object from not valid to valid, and if the at least one observation time interval is less than the predetermined threshold value, keeping at least temporarily the classification of the current object as not valid.

2. The method according to claim 1, wherein assessing the validity of the current object further comprises:

if the current object was classified at least temporarily as not valid, determining whether the object distance value $d_{k-i}$ of the object detected at the at least one previous detection instant $t_{k-i}$ is internal or external to the one or more critical intervals of distance values;

if the object distance value $d_{k-i}$ of the previously detected object is external to the one or more critical intervals of distance values, changing the classification of the current object from not valid to valid; and if the object distance value $d_{k-i}$ of the previously detected object is internal to the one or more critical intervals of distance values, keeping at least temporarily the classification of the current object as not valid.

3. The method according to claim 1, further comprising, after storing an object position $p_k$ and prior to assessing the validity of the current object:

sending the object position $p_k$ to an automatic trajectory generator configured for modeling a plurality of trajectories of a respective plurality of tracked objects, wherein each trajectory consists of at least one object position, for identifying each trajectory by assigning a respective trajectory code that represents a detected object, and for storing each trajectory in association with its respective trajectory code; and assigning, by the automatic trajectory generator, a trajectory code IDj to the object position $p_k$ of the current object and outputting the trajectory code IDj;

wherein assessing the validity of the current object comprises receiving the object position $p_k$ associated with the trajectory code IDj.

4. The method according to claim 3, wherein assessing the validity of the current object further comprises:

if the current object was classified at least temporarily as not valid, assessing whether the trajectory identified by the trajectory code IDj has been classified as valid in the at least one previous radar detection;

if the trajectory code IDj relative to the current object is associated with a trajectory already classified as valid, changing the classification of the current object from not valid to valid; and if the trajectory code IDj relative to the current object is associated with a trajectory classified at least temporarily as not valid, keeping the classification of the current object as not valid.

5. The method according to claim 3, wherein assessing the validity of the current object further comprises:

providing a first database configured for storing object positions and associated trajectory codes, wherein a classification as valid or an at least temporarily classification as not valid is associated with every trajectory code IDj;

if the current object was classified at least temporarily as not valid, querying the first database to check whether a classification as valid was associated in the at least one previous radar detection with the trajectory having the trajectory code IDj relative to the current object;

if a classification as valid is associated with the trajectory code IDj relative to the current object, changing the classification of the current object from not valid to valid; and if an at least temporarily classification as not valid is associated with the trajectory code IDj relative to the current object, keeping the classification of the current object as not valid;

wherein validating the current object comprises assigning a validity code to the trajectory IDj, the method comprising, after validating the current object, transmitting the object position $p_k$ of the current object in association with the trajectory code IDj and with the classification as valid to the first database.

6. The method according to claim 3, wherein assigning by the automatic trajectory generator, a trajectory code IDj to the object position $p_k$ comprises:

assessing whether at least one first trajectory identified by a first trajectory code is stored in the automatic trajectory generator;

if at least one first trajectory is stored, calculating a radar tracking time metric on a basis of a time interval between the current detection instant $t_k$ and detection instants of corresponding object positions of the at least one first trajectory to assess whether the current object position is compatible in time with the at least one first trajectory;

if the current object position is compatible in time with the at least one first trajectory, calculating a distance metric between the current object distance $d_k$ and object distances of the object positions of the at least one first trajectory to assess a compatibility in distance between the current object position $p_k$ and the object positions of the at least one first trajectory;

if the compatibility in distance of the current object position is established, assigning the first trajectory code to the object position of the current object; and if the compatibility in distance or the compatibility in time of the current object position is not established, assigning a second trajectory code different from the first trajectory code to the current object position.

7. The method according to claim 1, further comprising, before storing one or more critical intervals of distance values:

transmitting and receiving by the at least one radar transceiver a continuous wave radio signal that covers the monitored space in the absence of moving objects;

processing the trans ted radio signal and the return radio signal for producing a reference range profile;

in the reference range profile, selecting amplitude values greater than one or more predetermined amplitude threshold values and selecting respective and corresponding critical distance values; and defining one or more critical intervals of distance values, every critical interval being formed of a continuous sequence of distance values that represent a position and extension of a respective fixed object.

8. The method according to claim 1, further comprising, after validating the current object, generating a presence signal.

9. The method according to claim 1, wherein the transmitted radio signal is a frequency modulated continuous wave (FMCW) signal or a stepped frequency continuous wave (SFCW) signal.

10. The method according to claim 1, wherein the at least one radar transceiver is a plurality of radar transceivers configured for transmitting and receiving continuous wave radio signals that cover a respective visual field and that have a respective main transmission direction, the visual fields of adjacent transceivers of the plurality of transceivers being partially overlapped to each other, the combination of the visual fields forming the monitored space, and wherein the transceivers are arranged in such a way that the main transmission directions of adjacent transceivers are distinct from each other, each transceiver of the plurality of radar transceivers performing a plurality of radar detections which comprise a respective current radar detection and at least one previous radar detection, wherein analyzing the object range profile relative to the current radar detection comprises analyzing the object range profiles relative to their respective current radar detections performed by every transceiver by searching for amplitude peaks and their respective corresponding distances, identifying an amplitude peak in at least one object range profile that represents a current object by selecting an object distance value $d_k$, wherein analyzing further comprises calculating a respective signal amplitude value for every object range profile, determining a signal vector for each transceiver, wherein each signal vector is defined by a transmission direction and by a modulus, the transmission direction of the signal vector being coincident with the main transmission direction of the corresponding transceiver and the modulus being equal to the signal amplitude value calculated for the corresponding transceiver; and determining a direction $\theta_k$ of the current object by calculating an average signal vector of the plurality of signal vectors, wherein the direction $\theta_k$ of the current object is defined by the direction of the average signal vector;

wherein storing an object position $p_k$ comprises storing an object position for each transceiver, each object position being defined by the object distance value $d_k$, the direction $\theta_k$, and the detection instant $t_k$.

\* \* \* \* \*